United States Patent
Yasuda et al.

(10) Patent No.: US 12,225,893 B2
(45) Date of Patent: Feb. 18, 2025

(54) FISHING REEL

(71) Applicant: GLOBERIDE, Inc., Tokyo (JP)

(72) Inventors: Hiromu Yasuda, Tokyo (JP); Motohiro Nonogaki, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 124 days.

(21) Appl. No.: 17/980,295

(22) Filed: Nov. 3, 2022

(65) Prior Publication Data

US 2023/0133436 A1  May 4, 2023

(30) Foreign Application Priority Data

Nov. 4, 2021  (JP) .................. 2021-180324

(51) Int. Cl.
*A01K 89/01* (2006.01)
*A01K 89/015* (2006.01)
*A01K 97/12* (2006.01)

(52) U.S. Cl.
CPC .......... *A01K 89/015* (2013.01); *A01K 97/125* (2013.01)

(58) Field of Classification Search
CPC ............ A01K 89/015; A01K 89/01555; A01K 89/017; A01K 89/0178; A01K 89/0186; A01K 89/0192; A01K 97/125
See application file for complete search history.

(56) References Cited

U.S. PATENT DOCUMENTS

| | | | |
|---|---|---|---|
| 4,710,689 A | 12/1987 | Uetsuki et al. | |
| 10,575,508 B2 * | 3/2020 | Niitsuma | A01K 89/01555 |
| 2002/0158160 A1 * | 10/2002 | Shimizu | A01K 89/015 |
| | | | 242/223 |
| 2004/0148843 A1 * | 8/2004 | Ikuta | A01K 89/01555 |
| | | | 242/225 |
| 2008/0035775 A1 * | 2/2008 | Hoag | A01K 89/015 |
| | | | 242/305 |
| 2013/0037645 A1 | 2/2013 | Niitsuma et al. | |

(Continued)

FOREIGN PATENT DOCUMENTS

| | | | | |
|---|---|---|---|---|
| CN | 102197794 A | * | 9/2011 | ........... A01K 89/015 |
| CN | 101228856 B | * | 2/2013 | ........... A01K 89/015 |

(Continued)

OTHER PUBLICATIONS

May 24, 2024 Office Action issued in Chinese Patent Application No. 202211368241.2.

(Continued)

*Primary Examiner* — Emmanuel M Marcelo
(74) *Attorney, Agent, or Firm* — Oliff PLC (57) ABSTRACT

A fishing reel comprises: a spool designed to wind a fishing line by operation with an operating part; a first side plate having the operating part, the first side plate axially supporting the spool; a second side plate disposed opposite to the first side plate when viewed along an axis of the spool, the second side plate axially supporting the spool; an opposite side cover or a cover on an opposite side from the operating part, the opposite side cover covering the second side plate on a side opposed to the operating part; a control substrate disposed between the second side plate and the opposite side cover; and an electrical component electrically connected to the control substrate, the electrical component being disposed between the control substrate and the opposite side cover.

3 Claims, 5 Drawing Sheets

(56) References Cited

U.S. PATENT DOCUMENTS

| | | | |
|---|---|---|---|
| 2013/0233957 A1* | 9/2013 | Niitsuma | A01K 89/01923 |
| | | | 242/285 |
| 2017/0172130 A1 | 6/2017 | Komemushi et al. | |
| 2021/0298282 A1 | 9/2021 | Yasuda | |
| 2023/0093505 A1 | 3/2023 | Yasuda | |

FOREIGN PATENT DOCUMENTS

| | | | | |
|---|---|---|---|---|
| CN | 104412947 A | * | 3/2015 | ........... A01K 89/015 |
| CN | 107182963 A | * | 9/2017 | ........... A01K 89/015 |
| CN | 109566557 A | * | 4/2019 | ........... A01K 89/015 |
| EP | 0821874 A1 | * | 2/1998 | ........... A01K 97/125 |
| JP | H0310867 Y2 | | 3/1991 | |
| JP | H11253077 A | * | 9/1999 | ........... A01K 89/015 |
| JP | 2000217478 A | | 8/2000 | |
| JP | 2004208631 A | | 7/2004 | |
| JP | 2013034429 A | | 2/2013 | |
| JP | 2017108704 A | | 6/2017 | |
| JP | 2021-145655 A | | 9/2021 | |

OTHER PUBLICATIONS

Dec. 3, 2024 Office Action issued in Japanese Application No. 2021-180324.
Dec. 24, 2024 Office Action issued in Korean Application No. 10-2022-0143305.

* cited by examiner

FISHING REEL

CROSS-REFERENCE TO RELATED APPLICATION

This application claims priority under 35 U.S.C. § 119 to Japanese Patent Application No. 2021-180324 filed on Nov. 4, 2021 in the Japanese Patent Office, the entire contents of each hereby incorporated by reference.

FIELD

The present invention relates to a fishing reel that includes an electronic substrate.

BACKGROUND

In conventional double bearing reels for fishing, electronic substrates are used to serve purposes such as controlling a motor for retrieving a fishing line, displaying a line length, and controlling a brake on a casting reel.

In such double bearing reels for fishing that have display screens such as liquid crystal screens, the display screen is often disposed on a front upper surface of the double bearing reel to ensure visibility and the electronic substrate is also disposed parallel to the display screen. Even in a double bearing reel without a display screen, as in JP 2004-208631 A, an electronic substrate is disposed parallel to a side plate to control a brake on the double bearing reel for casting and thereby allow the electronic substrate to be readily placed close to a location at which electrical components such as a braking force generating part and a spool rotation detector are disposed. This enables the reel to facilitate waterproofing and avoid an increase in overall apparatus size.

SUMMARY

Adding communication, data storage, and other extended capabilities to an electronic substrate inevitably increases a size of area of the electronic substrate. Unfortunately, in the fishing reel of JP 2004-208631 A, the electrical components are disposed on the electronic substrate and hence the sizes and disposition of the electrical components of all kinds are inevitably influenced by a dimension of the electronic substrate in a direction of extension and thus by a dimension of the fishing reel in the substrate extension direction.

In view of the above background, it is an object of the present invention to provide a fishing reel that allows an electrical component to be disposed inside without causing an increase in overall size of the fishing reel while improving friendliness to palm. Purposes of the present invention other than this object will be clarified by referring to the overall description disclosed herein.

A fishing reel according an embodiment of the present invention comprises: a spool designed to wind a fishing line by operation with an operating part; a first side plate having the operating part, the first side plate axially supporting the spool; a second side plate disposed opposite to the first side plate when viewed along an axis of the spool, the second side plate axially supporting the spool; a cover on an opposite side from the operating part (an opposite side cover), the opposite side cover covering the second side plate on a side opposed to the operating part; a control substrate disposed between the second side plate and the opposite side cover; and an electrical component electrically connected to the control substrate, the electrical component being disposed between the control substrate and the opposite side cover.

In the fishing reel according to an embodiment of the present invention, the opposite side cover has a convex shape that is curved toward a side opposite the operating part with respect to the second side plate such that a user is allowed to hold the fishing reel.

In the fishing reel according to an embodiment of the present invention, the electrical component comprises at least one of a notification part for sending a notification to a user, a display part for displaying information to the user, a communication part for communicating with a device outside the fishing reel, and an environmental power generation part for converting energy present on a periphery of the fishing reel into electricity.

According to the embodiment above, the electrical component can be disposed in a space between the side plate on a side opposed to the operating part and the opposite side cover designed in consideration of friendliness to palm. This configuration makes it possible to provide a fishing reel that allows an electrical component to be disposed inside without causing an increase in overall apparatus size while improving friendliness to palm.

DETAILED DESCRIPTION

An embodiment of a fishing reel according to the present invention will now be described in detail with reference to the accompanying drawings. Components common among multiple drawings are denoted by the same reference signs in the multiple drawings. It should be noted that for the convenience of description, the drawings are not always shown in a precise aspect ratio.

With reference to FIGS. 1 to 4, a fishing reel according to an embodiment of the present invention and a braking device included in the fishing reel will be described. Illustration and description of some known functions of a fishing reel 1 are omitted for the simplicity of description.

Figure 1:
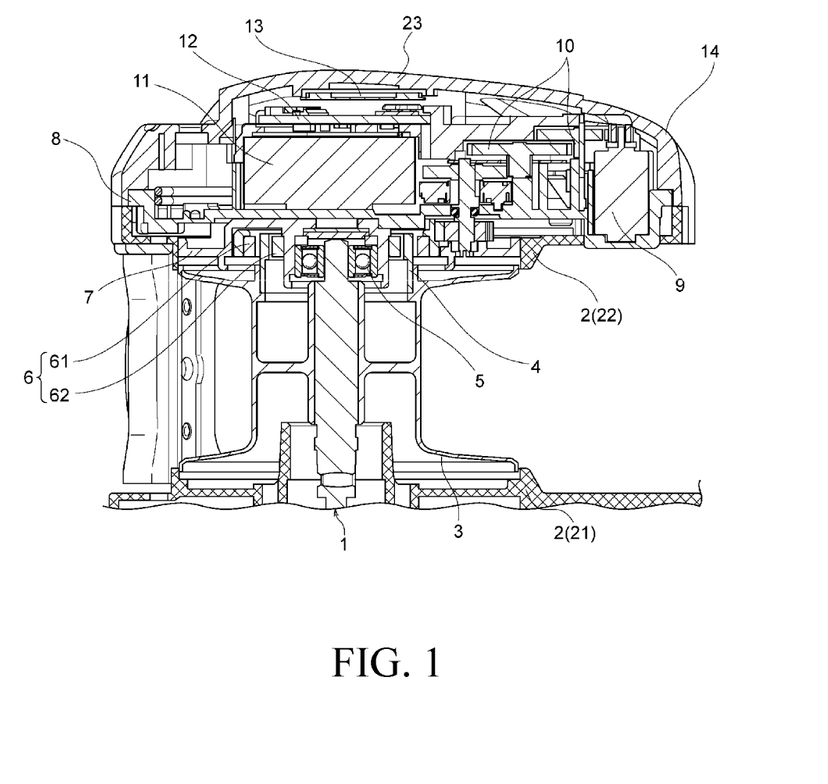
FIG. 1 is a drawing illustrating a fishing reel according to an embodiment of the present invention.

FIG. 1 is a cross-sectional view of the fishing reel 1, showing a cross section taken along a central axis of a reduction gear train described later. Illustration and description of some known functions of a fishing reel 1 are omitted for the simplicity of description.

As shown in FIG. 1, the fishing reel 1 according to an embodiment of the present invention comprises a frame (main reel body) 2, a spool 3, a braked part (braked means) 4, a bearing 5, a braking part (braking means) 6, a set plate 7, an inner lid 8, a motor 9, a deceleration mechanism (reduction gear train) 10, a battery 11, a control substrate 12, an electrical component 13, and a cover 14 on an opposite side from an operating part (an opposite side cover 14). However, elements other than these components may be included.

The frame (main reel body) 2 is made so as to be attachable to a fishing rod (not shown). The fishing reel 1 according to an embodiment of the present invention, in a similar way to the conventional fishing reel, has an operating part or operating means (not shown, e.g., a handle) that allows the spool 3 to be rotated in a forward direction by a user's operation to retrieve a fishing line. A rotating force caused by the operating part or operating means (hereinafter referred to as the operating part) is transmitted to the spool 3 through transmission means such as a gear (not shown).

The fishing reel 1 according to an embodiment of the present invention has a clutch part (or clutch means, not shown). By operating the clutch part (or clutch mean), the user is able to select whether a clutch for power transmission engages with or disengages from the spool 3. When the clutch for power transmission is engaged with the spool 3, the fishing line can be retrieved by the operating part. On the other hand, when the clutch for power transmission is disengaged from the spool 3, the spool is allowed to freely rotate in forward and reverse directions and the fishing line can be released.

The fishing reel 1 according to an embodiment of the present invention may comprises a drag part or drag means (not shown) to allow the spool 3 to run at idle in the event of torque of a predetermined level or higher and thereby prevent the fishing line from being broken or may include a counter rotation preventive part or counter rotation preventive means (not shown) to prevent the operating part from counter rotating. Moreover, an oscillator device (not shown) may be provided to evenly retrieve the fishing line by allowing a position of a fishing line guiding part that guides the fishing line to reciprocate in response to the rotation of the spool 3.

The spool 3 is supported by the main reel body 2 so as to be rotatable relative to the main reel body 2. The spool 3 rotates in the forward direction and thereby makes it possible to retrieve and wind the fishing line on an outer peripheral area of the spool 3. On the other hand, a lure or something similar is cast when the spool 3 rotates in the reverse direction and makes it possible to release the wound fishing line. At this time, if an amount of the released fishing line is much larger than an amount of travel of the lure or the like, line entanglement called a backlash can occur due to an excessive portion of the fishing line, preventing proper use of the fishing reel 1 in some cases. Hence, appropriate braking force may be applied to the spool 3 by a braking device 10 described later to prevent such a backlash.

The braked part 4 is fixed to the spool 3 and receives braking force caused by the braking part 6. In the fishing reel 1 according to an embodiment of the present invention, the braking part 6 uses an eddy current braking system to generate eddy currents by applying a magnetic field to a conductive plate through a permanent magnet. The braking force caused by the braking part 6 to the braked part 4 is adjustable by the motor 9.

Figure 2A:
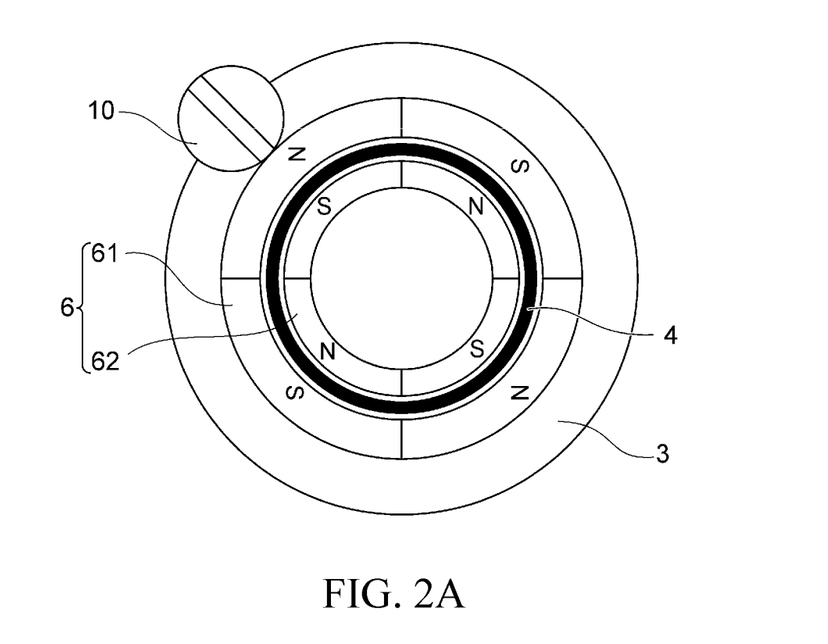
FIGS. 2A to 2B are drawings showing a configuration of a braking device according to an embodiment of the present invention.
Figure 2B:
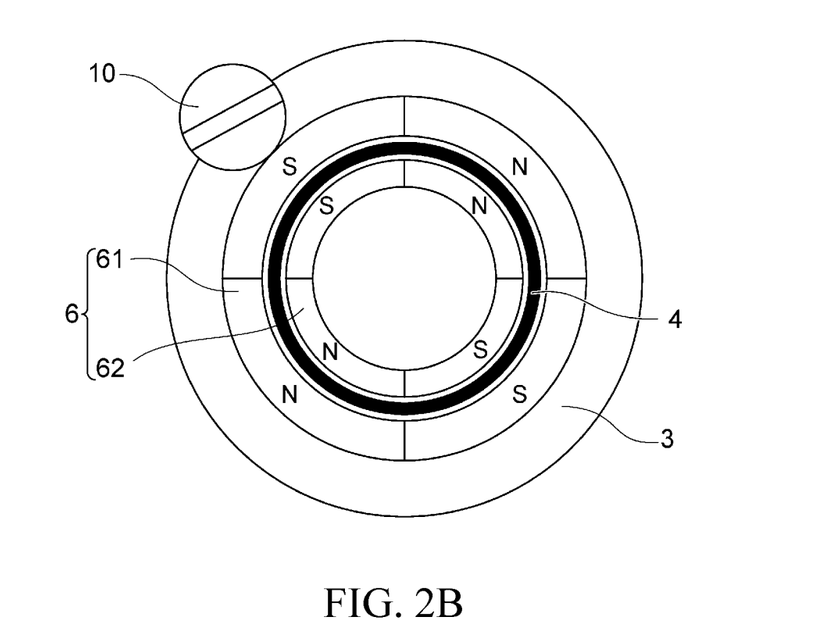

Next, with reference to FIGS. 2A and 2B, a structure of the braking part 6 in the fishing reel 1 according to an embodiment of the present invention will be described. As shown in the drawings, the braking part 6 includes a rotating magnet 61 supported by the set plate 7 (not shown) so as to be rotatable and a stationary magnet 62 fixed to the set plate 7 (not shown). The rotating magnet 61 and the stationary magnet 62 form a magnetic circuit, and a magnetic field generated by the magnetic circuit is formed so as to pass through the braked part 4 made of a conductor. Thus, braking force proportional to intensity of the magnetic field and rotation speed of the spool 3 is caused to the braked part 4.

Power produced by the motor 9 is transmitted to the rotating magnet 61 through a gear or such means to enable the rotating magnet 61 to rotate. In this way, by shifting the rotating magnet 61 to a predetermined place (a shift from a state in FIG. 2A to a state in FIG. 2B by rotation of the rotating magnet 61) and adjusting the braking force applied to the braked part 4, which is fixed to the spool 3, the rotation speed of the spool 3 can be adjusted.

As for the fishing reel 1 according to an embodiment of the present invention, the system for adjusting the braking force is not limited to any specific style. A known braking system that can be appropriately used as the system for adjusting the braking force is, for example, a friction system by which frictional force is applied to the braked part 4 and a dynamic braking system by which braking force is caused by a coil to a permanent magnet attached to the spool 3, but the system for adjusting the braking force is not limited to these systems. As described later, such braking means is not a requisite function of the present invention, and a control circuit may be used for a purpose other than adjusting the braking means.

The frame 2 includes a first part of the frame 2 on a side having the operating part described above and a second part of the frame 2 on a side opposed to the side having the operating part when viewed along an axis of the spool 3. The frame 2 is configured such that the set plate 7 is allowed to be attached to the second part of the frame 2. The first part has a surface (referred to as a first surface) orthogonal to a rotating shaft of the spool 3, and the second part has a surface parallel to the first surface and clamps the spool shaft together with the first surface. This configuration axially supports one end of the spool 3 by the first part of the frame 2 and the other end of the spool 3 by the set plate 7 via a respective bearing 5. In the fishing reel 1 according to an embodiment of the present invention, the first part of the frame 2 is referred to as a first side plate 21 of the frame 2, and the second part of the frame 2 is referred to as a second side plate 22 of the frame 2. The second side plate may include the set plate and other elements but is not limited to any specific style.

In the fishing reel 1 according to an embodiment of the present invention, the set plate 7 and the inner lid 8 are made of separate materials and are fastened to each other with screws or other fasteners to achieve purposes such as reducing weight, reducing costs, and ensuring strength. This allows other parts to be accommodated between the set plate 7 and the inner lid 8. Meanwhile, the set plate 7 and the inner lid 8 may be an integrated part to help reduce a number of parts.

The inner lid 8 is fixed to the opposite side cover 14 so as to make an internal space airtight. This prevents ingress of water and other substances into components accommodated in the internal space. A waterproof joining member (waterproof joining means) implemented by a gasket such as an O-ring, a double-sided waterproof tape, a laser welded part, a seal-case structure, waterproof grease, or other similar stuff may be disposed as a closed loop throughout a peripheral face where the inner lid 8 and the opposite side cover 14 are joined together to prevent ingress of water and other substances from outside into the space (internal space) formed by the inner lid 8 and the opposite side cover 14. The motor 9, the deceleration mechanism (reduction gear train) 10, the battery 11, the control substrate 12, and the electrical component 13 are accommodated in the internal space formed in this way to make these components waterproof.

Figure 5:
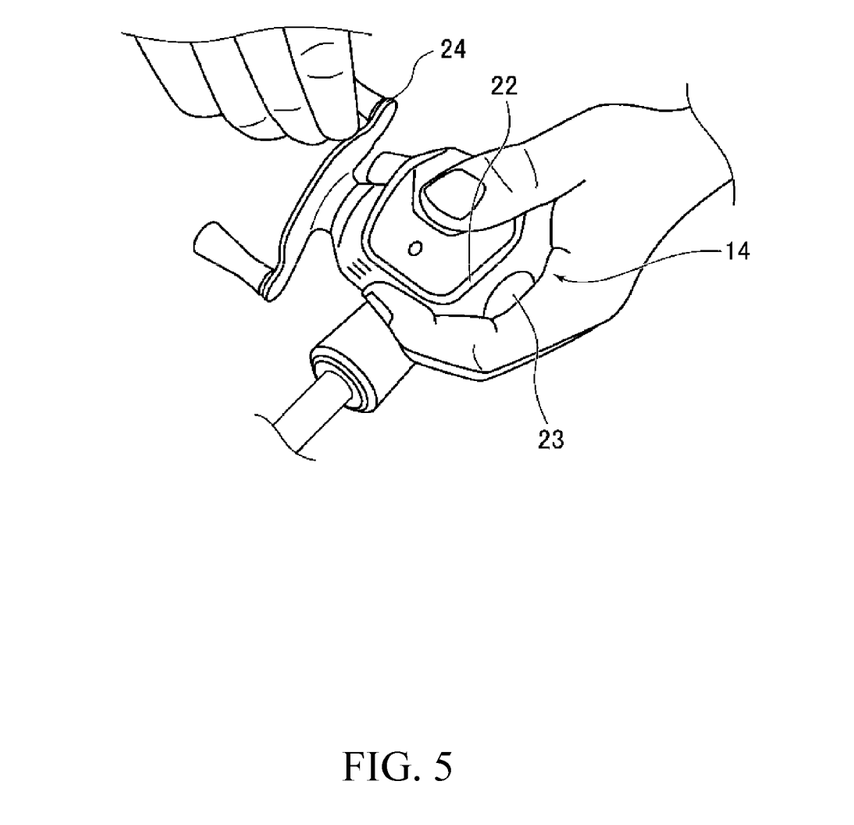
FIG. 5 is a drawing illustrating an outside surface of a cover on an opposite side from an operating part of a fishing reel according to an embodiment of the present invention.

As shown in FIG. 5, a palm-side portion 23 is formed on an outside surface of the opposite side cover 14. The palm-side portion 23 has a convex shape that is curved outward from the opposite side cover 14 (curved toward a side opposite the operating part 24 with respect to the second side plate 22) such that the user's hand is allowed to be put on and hold the fishing reel. For instance, the palm-side portion 23 may have a substantially spherical shape that is convexly curved outward from the opposite side cover 14 (curved toward a side opposite the operating part 24 with respect to the second side plate 22). However, the convex shape can be made in various styles in consideration of friendliness to palm and is not limited to any specific style. The convex shape referred to herein is a part of a substantially spherical shape or an ellipsoid with a radius of curvature approximately equal to that of curved palms of general users, for example, and is a shape without any large protrusion and acute-angled part to ensure that the shape does not give the user a sense of discomfort but allows the user's hand to be put on and readily hold the fishing reel. This enables the user to stably hold the fishing reel when casting a lure or something similar or handling the operating part.

The opposite side cover 14 in itself may have a convex shape that is curved outward from the opposite side cover 14 (curved toward a side opposite the operating part with respect to the second side plate 22). This configuration makes material wall thickness uniform and provides the opposite side cover 14 with both friendliness to palm and ease of manufacturability.

A fishing reel 1 according an embodiment of the present invention comprises: a spool 3 designed to wind a fishing line by operation with an operating part; a first side plate 21 having the operating part, the first side plate 21 axially supporting the spool 3; a second side plate 22 disposed opposite to the first side plate 21 when viewed along an axis of the spool 3, the second side plate 22 axially supporting the spool 3; a cover 14 on an opposite side from to the operating part (an opposite side cover 14), the opposite side cover 14 covering the second side plate 22 on a side opposed to the operating part; a control substrate 12 disposed between the second side plate 22 and the opposite side cover 14; and an electrical component 13 electrically connected to the control substrate 12, the electrical component 13 being disposed between the control substrate 12 and the opposite side cover 14.

With regard to the fishing reel 1 according to an embodiment of the present invention, the electrical component can be disposed in a space (a dead space described later) between the side plate on a side opposed to the operating part and the opposite side cover. This configuration makes it possible to provide a fishing reel that allows an electrical component to be disposed inside without causing an increase in overall apparatus size while improving friendliness to palm.

In the fishing reel 1 according to an embodiment of the present invention, the opposite side cover 14 has a convex shape that is curved toward a side opposite the operating part with respect to the second side plate 22 (curved toward the outside surface of the opposite side cover 14) such that a user is allowed to hold the fishing reel. This enables the user to stably hold the fishing reel when casting a lure or something similar or handling the operating part. At the same time, the electrical component can be disposed in a space between the side plate on a side opposed to the operating part and the opposite side cover. This configuration makes it possible to provide a fishing reel that allows an electrical component to be disposed inside without causing an increase in overall apparatus size while improving friendliness to palm.

The control substrate 12 comprises a printed board on which conductor routing is formed by printing or other technique and has a control circuit such as a microcomputer. The control substrate 12 may comprise detection means of every kind such as a temperature sensor and a motion sensor, input means such as a button, output means such as a light-emitting diode (LED), communication means such as a radio communication module, or storage means such as flash memory.

This enables the circuit board to sense a state of fishing reel 1, store such information, or send or output such information externally. The fishing reel 1 according to an embodiment of the present invention comprises a motor driver and thus is able to control the motor 9. This enables the circuit board to adjust braking force of the braking device in response to the state of the fishing reel 1. In the fishing reel 1 according to an embodiment of the present invention, a role of the control substrate 12 is not limited to controlling of the braking device. The circuit board (control substrate) 12 may also be used to control various motors for the fishing reel 1, such as a motor for retrieving the fishing line, a drag force setting motor, and a motor for switching between clutch engagement and disengagement.

With an increase in variety of functions on the control substrate 12, the electrical components such as the detection means, the output means, the input means, and the communication means increase. To implement these functions on the printed board, the printed board is required to have an area (an area of the printed board in the direction of extension) larger than or equal to a predetermined size. The printed board is generally formed into a simple planar shape such as a substantially rectangular shape, a substantially circular shape, and an annular shape owing to a constraint on cost or manufacturing method. On the other hand, the opposite side cover 14 is formed into a convex shape such as a substantially spherical shape, as described above, because of the palm-side portion disposed outside.

Figure 3:
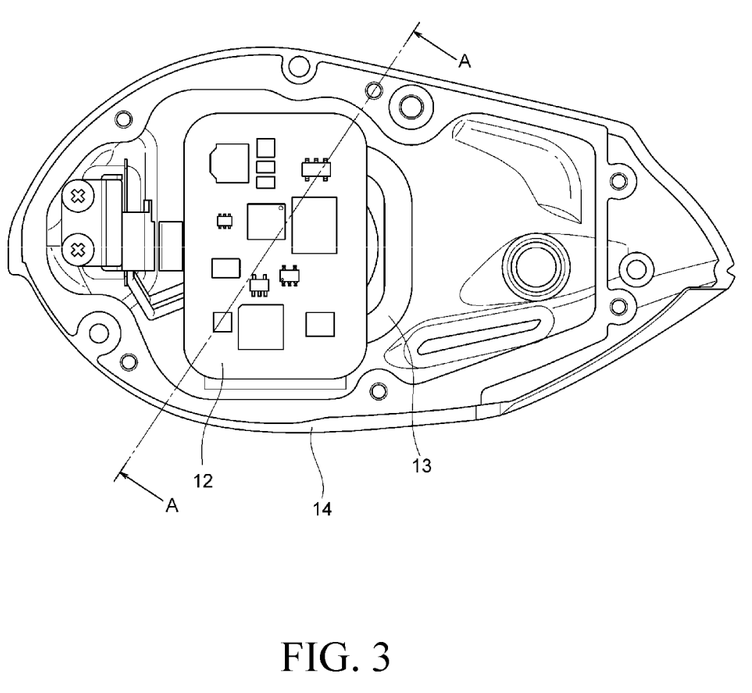
FIG. 3 is a drawing showing part of an inside of a fishing reel according to an embodiment of the present invention.

Next, with reference to FIGS. 3 and 4, the opposite side cover 14, the control substrate 12, and the electrical component 13 in the fishing reel 1 according to an embodiment of the present invention will be described further. FIG. 3 is a bottom view of the control substrate and other upper elements in FIG. 1 viewed from a lower side to an upper side in a superior-inferior direction of a paper surface of FIG. 1. As shown in FIG. 3, the opposite side cover 14 is disposed around the control substrate 12 (a superior-inferior direction and a lateral direction or the direction of extension of the control substrate 12 on a paper surface of FIG. 3). With an increase in variety of functions on the control substrate 12, an area of the control substrate 12 accounts for a larger proportion of a projected area of the opposite side cover 14.

Figure 4:
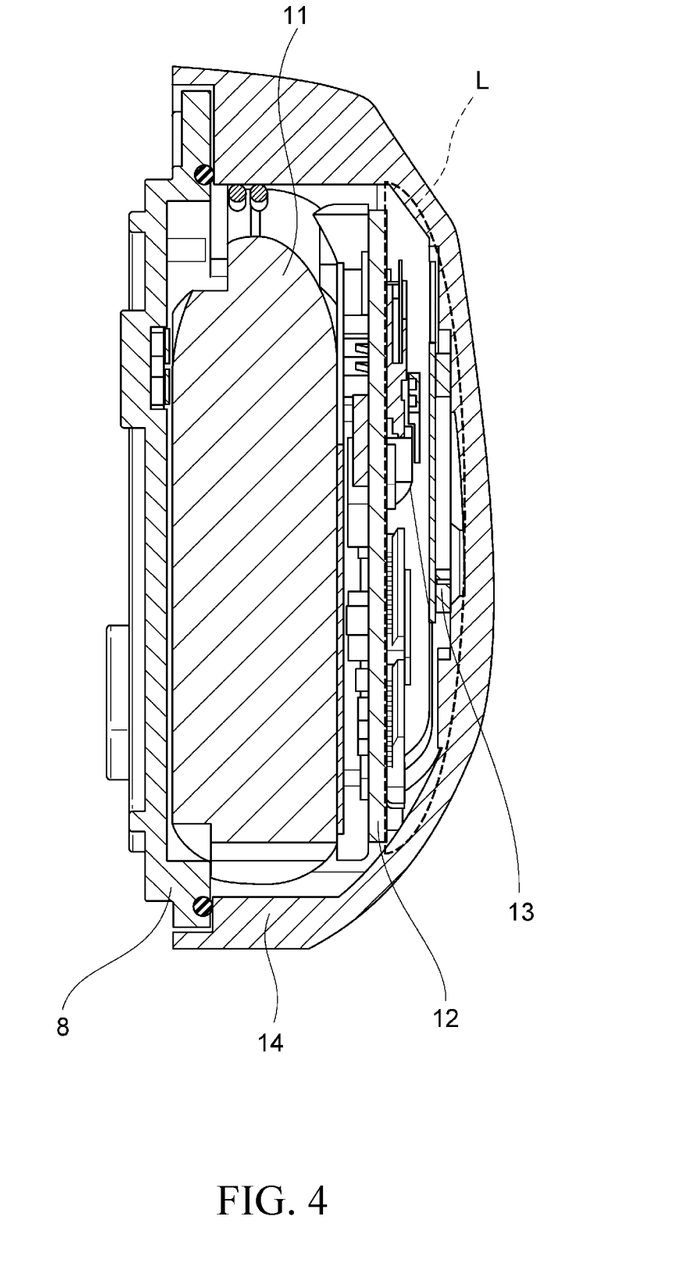
FIG. 4 is a cross-sectional view of a fishing reel according to an embodiment of the present invention.

FIG. 4 shows a cross section taken along line A-A of FIG. 3. As shown in FIG. 4, when an inner surface of the opposite side cover 14 and an edge or an end of the control substrate 12 in the direction of extension (in a lateral direction of a paper surface of FIG. 4 get close to each other to miniaturize the fishing reel 1, a dead space can be made small. However, while the inner surface of the opposite side cover 14 is formed into a convex shape (e.g., a substantially spherical shape) to improve friendliness to palm, the control substrate 12 is formed into a substantially planar shape, as described above.

Thus, even if the opposite side cover 14 and the control substrate 12 get closest to each other, a dead space (a space region L shown in FIG. 4) is created between a top surface of the control substrate 12 (an upper side surface of the control substrate 12 on the paper surface of FIG. 4) and the inner surface of the opposite side cover 14. This space is hereinafter referred to as a convex space or lens-shaped space L.

The fishing reel 1 according to an embodiment of the present invention is configured such that the electrical component 13 is disposed in the convex space or lens-shaped space L to make effective use of the convex space or lens-shaped space L. Examples of the electrical component 13 include a notification part or means such as a buzzer used to emit a notification sound to a user and a pager motor used to output vibrations, a communication part or means such as a radio communication antenna and a wired communication connector, a display part or means such as an LED and a liquid crystal display, an environmental power generation part or means for converting energy present on a periphery of the apparatus into electricity, such as a photovoltaic cell, an oscillation power generation part or means and a thermoelectric power generation part or means, and a power source such as a button battery. However, the electrical component is not limited to these examples.

The electrical component 13 of any of these examples is disposed as a single electrical component or is disposed on a flexible cable or a printed circuit that is independent of the control substrate 12, and is electrically connected to the control substrate 12 by a wired cable or the like. In an example shown in FIG. 3, a buzzer and a radio communication antenna printed on a flexible cable can be disposed in the convex space or lens-shaped space L and be attached to the inner surface of the opposite side cover 14 by a double-sided tape or other means.

In this way, the fishing reel 1 according to an embodiment of the present invention is allowed to increase the variety of fishing reel functions while avoiding an increase in fishing reel size. More specifically, as described above, whereas the control substrate 12 is required to have a planar shape to improve productivity, the opposite side cover 14 has a convex shape (e.g., a substantially spherical shape) to improve friendliness to palm. This creates the convex space or lens-shaped space L between the opposite side cover 14 and the control substrate 12. This configuration allows the electrical component 13 to be efficiently disposed in a place that is originally the dead space and thus enables the fishing reel to increase the variety of functions without causing an increase in size of the control substrate 12 in the direction of extension and a resultant increase in size of the opposite side cover 14.

Some electrical components such as communication antennas and photovoltaic cells improve their performance with an increase in projected area. The fishing reel including especially such an electrical component causes a large effect. When any of these components is disposed in the direction of extension of the control substrate 12, an increase in fishing reel size is unavoidable. A disposition of the electrical component in the convex space or lens-shaped space L not only enables the control substrate 12 and the electrical component 13 to make effective use of the space but also helps to reduce the area of the control substrate 12 in the direction of extension (in superior-inferior and lateral directions of a paper surface of FIG. 3, in the lateral direction of the paper surface of FIG. 4) when the electrical component is disposed so as to at least partly overlap with the control substrate in a direction of thicknesses of these components (in a superior-inferior direction of the paper surface of FIG. 4).

When a buzzer is used as the electrical component, this configuration has an advantage of facilitating notification to the user. The buzzer used as the electrical component is preferably attached to a place at which an antinode of vibration of a part is positioned. This enables the buzzer to vibrate together with the part holding the buzzer, causing the level of notification sound to rise. The opposite side cover 14, as described above, is fixed to the inner lid 8 so as to make an internal space airtight, and thus a node of vibration is positioned at a face where the opposite side cover and the inner lid closely stick together. The convex space or lens-shaped space L is away from the face where the components closely stick together and is apt to be the antinode of vibration. Hence, with the buzzer attached to a place in such a space, this configuration gives an advantage of facilitating a rise in notification sound level.

When a pager motor is used as the electrical component, the pager motor can be disposed at a place such as an exact reverse side of an area that is directly held by the user. This configuration gives an advantage of facilitating notification to the user. When display means such as an LED or a liquid crystal display is used as the electrical component, the display part or means can be disposed in an outermost region of the apparatus (the fishing reel). This configuration has an advantage of facilitating notification to the user.

When a communication part or means is used as the electrical component, an antenna can be disposed in the outermost region of the apparatus (the fishing reel). This configuration gives an advantage of enabling the antenna to be less susceptible to electromagnetic interference from other components and facilitating an improvement in communication performance. When a wired connector is used as a communication part or means, the wired connector can be disposed in the outermost region of the apparatus (the fishing reel). This configuration gives an advantage of enabling the user to readily remove and insert the connector.

When an environmental power generation part or means is used as the electrical component, this configuration gives an advantage of facilitating power generation. When a photovoltaic cell is used as an environmental power generation part or means, the photovoltaic cell can be disposed in the outermost region of the apparatus (the fishing reel). This configuration helps to ensure power generation performance.

When an oscillation power generation part or means is used as an environmental power generation part or means, the oscillation power generation part or mean can be disposed at a place at which an antinode of vibration of the opposite side cover 14 is positioned. Similarly, this configuration helps to ensure power generation performance. When a thermoelectric power generation part or means is used as an environmental power generation part or means, the thermoelectric power generation part or means can be disposed at a place near an area held by the user's hand and near the outside air. This configuration allows the power generation part or means to be warmed by the user's body temperature and be cooled by the outside air with ease and helps to ensure power generation performance.

When a battery such as a button battery is used as the electrical component, the battery can be disposed in the outermost region of the apparatus (the fishing reel). This configuration gives an advantage of enabling the user to readily remove and insert the battery. Since the battery is disposed in the convex space or lens-shaped space L, a battery such as a thin button battery or lithium polymer battery is preferably used.

The dimensions, materials, and arrangement of components described in the present specification are not limited to those explicitly described in the embodiment. The components can have any modified dimensions, materials, and arrangement that are included within the scope of the present invention. A component that is not explicitly described in the present specification can be added to the described embodiment, and some of the components described in the embodiment can be omitted.

REFERENCE SIGNS LIST 1 fishing reel
2 frame (main reel body)
3 spool
4 braked part (braked means)
5 bearing
6 braking part (braking means)
7 set plate
8 inner lid
9 motor
10 deceleration mechanism (reduction gear train)
11 battery
12 control substrate
13 electrical component
14 cover on opposite side from operating part (opposite side cover)
21 first side plate
22 second side plate
23 palm-side portion
24 operating part
61 rotating magnet
62 stationary magnet

What is claimed is:

1. A fishing reel comprising: a spool designed to wind a fishing line by operation with an operating part; a first side plate having the operating part, the first side plate axially supporting the spool; a second side plate disposed opposite to the first side plate when viewed along an axis of the spool, the second side plate axially supporting the spool; a cover on an opposite side from the operating part, the cover covering the second side plate on a side opposed to the operating part; a control substrate disposed between the second side plate and the cover; and an electrical component electrically connected to the control substrate, wherein (i) the cover has an inner surface, (ii) the control substrate has a substantially planar shape, (iii) a convex-shaped space is defined between the inner surface of the cover and the control substrate, and (iv) the electrical component is disposed within the convex-shaped space between the inner surface of the cover and the control substrate.

2. The fishing reel according to claim 1, wherein the cover has an outer surface with a convex shape that is curved toward a side opposite the operating part with respect to the second side plate such that a user is allowed to hold the fishing reel.

3. The fishing reel according to claim 1, wherein the electrical component comprises at least one of a notification part for sending a notification to a user, a display part for displaying information to the user, a communication part for communicating with a device outside the fishing reel, and an environmental power generation part for converting energy present on a periphery of the fishing reel into electricity.

* * * * *